Oct. 31, 1939.                W. J. WALLACE, JR                  2,178,443
                              MECHANICAL MOVEMENT
                              Filed Dec. 3, 1938              2 Sheets-Sheet 1

Inventor
Walter J. Wallace Jr.
By his Attorneys
Merchant & Merchant

Oct. 31, 1939.   W. J. WALLACE, JR   2,178,443
MECHANICAL MOVEMENT
Filed Dec. 3, 1938    2 Sheets—Sheet 2

Inventor
Walter J. Wallace Jr.
By his Attorneys

Patented Oct. 31, 1939

2,178,443

UNITED STATES PATENT OFFICE 2,178,443

MECHANICAL MOVEMENT

Walter J. Wallace, Jr., Milwaukee, Wis.

Application December 3, 1938, Serial No. 243,782

6 Claims. (Cl. 74—307)

My invention provides a new mechanical movement in the nature of an irreversible motion transmission device and, generally stated, consists of the novel devices, combinations of devices and arrangement of parts hereinafter described and defined in the claims.

A device of this kind will be found serviceable in various different uses. For example, we will say that it is an efficient motion transmission device in the steering post or in the wheel-steering mechanism of an automobile; it would serve as an efficient transmission element or part of means for operating elevators or lifting devices; but generally, it will serve the purpose of a power transmission device wherein motion will be imparted by power applied to the driving shaft or element, but the transmission mechanism will be locked against reverse movement or power applied to the driven shaft or element.

The invention is illustrated in the accompanying drawings wherein like characters indicate like parts throughout the several views.

Referring to the drawings.

Figure 1:
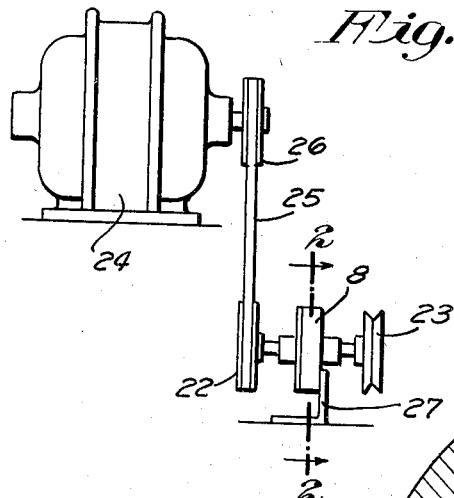
Fig. 1 is a side elevation showing the irreversible transmission device with its driving element arranged to be driven by an electric motor.
Figure 2:
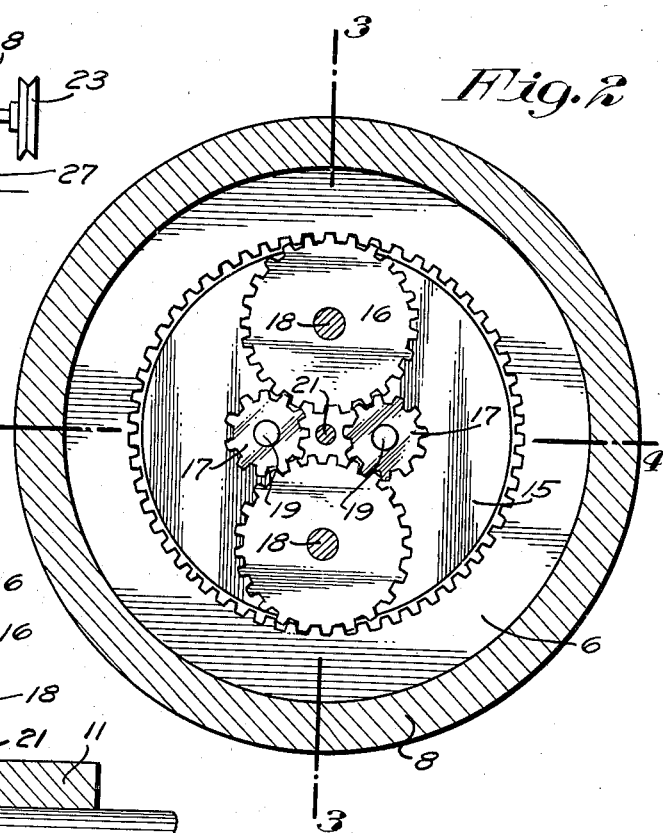
Fig. 2 is a section taken on the line 2—2 of Fig. 1, showing the parts on a larger scale than in Fig. 1.
Figure 3:
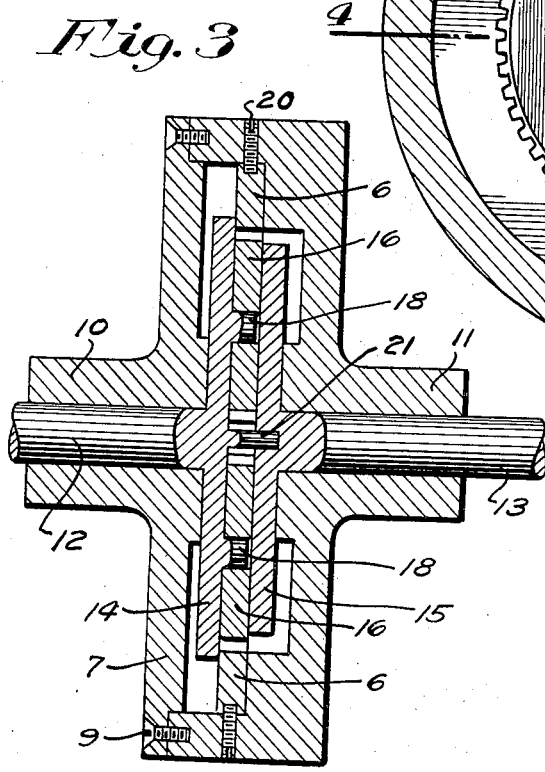
Fig. 3 is a section taken on the line 3—3 of Fig. 2, some parts being shown in full.
Figure 4:
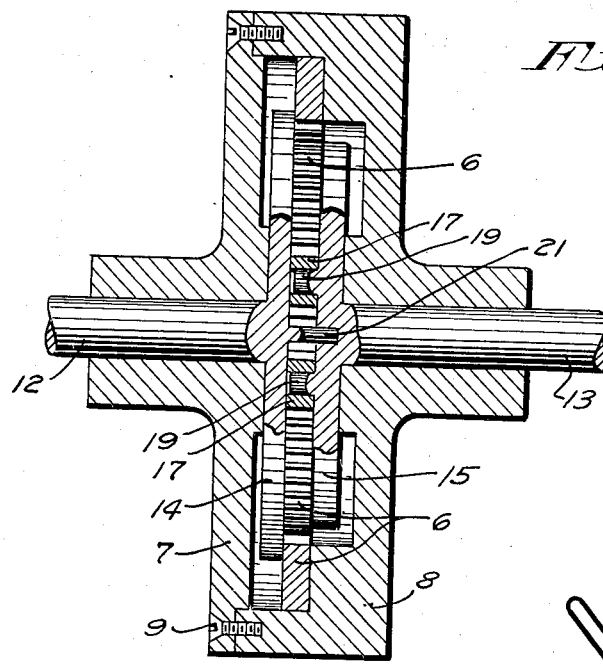
Fig. 4 is a section taken on the line 4—4 of Fig. 2, some parts being shown in full.

Referring first to the construction illustrated in Figs. 1, 2, 3 and 4, the numeral 6 indicates an internal ring gear that is located within and rigidly secured to a two-part casing 7—8 that is fixed against rotation. The case sections 7—8 are shown as rigidly connected by screws 9 and said case sections, respectively, are provided with axially projecting bearing hubs 10 and 11. A driving shaft 12 extends through and is journaled in the bearing hub 10 and the driven shaft 13 is extended through and journaled in the bearing hub 11. Within the casing, the driving shaft 12 is provided with a disc-like driving head 14 and within said casing the driven shaft 13 is provided with a disc-like driven head 15. The two heads 14 and 15 are spaced to afford clearance for planetary gears 16 and planetary pinions 17. The gears 16 are journaled on trunnions 18 projected from the driving head 14 while the pinions 17 are journaled on trunnions 19 projected from the driven head 15. The gears 16 are diametrically spaced and mesh with the internal ring gear 6 and the pinions 17 are diametrically spaced and mesh with the two gears 16. The pinions or small gears, it will be noted, are located with their axes much closer to the common axis of the shafts 12 and 13 than are the gears 16. As shown, the ring gear 6 is a separately formed element rigidly secured to the case section 8 by set-screws 20.

To insure and maintain good axial alignment with the shafts 12 and 13, the driving disc 14 is shown as provided with an axially projecting trunnion or reduced end 21 that is seated in an axial cavity of the driven head 15.

For illustrative purposes, the driving shaft 12 is shown as provided with a driving pulley 22 and the driven shaft 13 is shown as provided with a driven pulley 23; and the driving pulley 22 is shown as driven from an electric motor 24 through a belt 25 that runs over said pulley 22 and over a pulley 26 on the shaft of the rotor of the motor 24.

As above indicated, the casing and hence the ring gear should be held against rotation. This anchoring of the casing, as shown in Fig. 1, is accomplished by a fixed bracket 27 secured to a suitable non-movable support and rigidly attached to the case section 8; but it will be understood that this anchoring of the said elements 6, 7 and 8 may be accomplished in various different ways.

The operation of the non-reversible mechanical motion or transmission mechanism is substantially as follows: When power is applied to the driving shaft 12 in either direction, the driven shaft 13 will be rotated in the same direction; but when attempt is made to rotate the shaft 12 by power applied to the shaft 13, the transmission mechanism will be locked against rotation. This action will be made clear by the following specific illustration. For instance, assume that power is applied to the drive shaft 12 tending to rotate the same and the driving head 14 in a clockwise direction. Under power thus applied, the gears 16 will be rotated in a counter-clockwise direction and their supporting trunnions 18 will be caused to travel orbits in a clockwise direction or in the same direction as the motion imparted to the driving shaft 12. Under the above noted movement, the pinions 17 that mesh with the gears 16 will be rotated in a clockwise direction, but their supporting trunnions 19 will be caused to travel orbits in a clockwise direction, but on a smaller orbit than that travelled by the trunnions 18.

Now assume that attempt is made to rotate shaft 12 by power applied to shaft 13. Under such force, the pinions 17 will be simply forced or pressed toward the gears 16 on lines of force directed more or less toward the axes of the gears 16 and trunnions 18, and this force simply presses the gears 16 outward or toward the fixed internal gear 6, thereby locking the mechanism against the transmission of movement in either direction.

The provision of the two planetary gears and two planetary pinions is important in the rendering of the transmission mechanism operative in the same manner, regardless of the direction of the torque applied to and tending to rotate the one shaft or member from the other.

Figure 5:
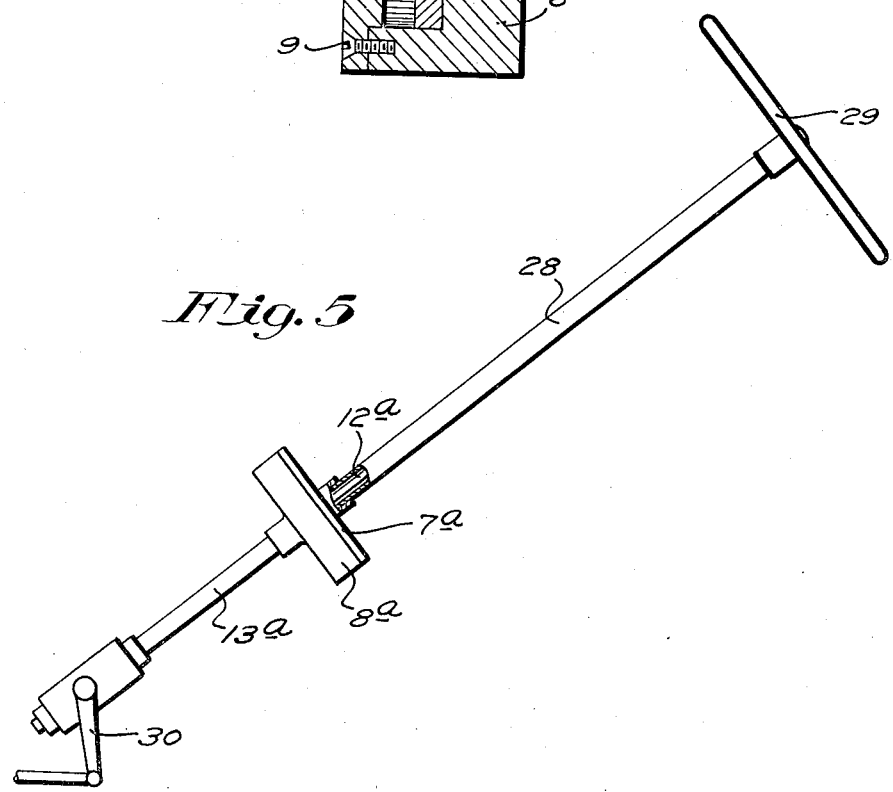
Fig. 5 is a side elevation showing the irreversible device applied in the steering mechanism of an automobile.

The internal mechanism of the mechanical movement device shown in Fig. 5 is or may be the same as that described in connection with Figs. 1, 2, 3 and 4. Here the fixed case which has the internal gear is indicated by the characters 7a and 8a and the driving shaft 12a is incorporated in the steering post 28 and is provided with a steering wheel 29. The casing is incorporated as a part of the steering post and the driven shaft 13a is connected in the customary way to a lever 30 of the wheel connection.

From the foregoing it will be understood that the device described is capable of various modifications and various applications or uses within the scope of the invention herein disclosed and claimed.

What is claimed is:

1. In a device of the kind described, a non-rotary internal gear, a driving member, a driven member, said gear and driving and driven members being in co-axial arrangement, a gear journaled to said driving member at a point eccentric to its axis and meshing with said internal gear, and a pinion journaled to said driven member at a point eccentric to its axis and meshing with said gear.

2. In a device of the kind described, a non-rotary internal gear, a driving member, a driven member, said internal gear and driving and driven members being in co-axial arrangement, a pair of diametrically spaced gears journaled to said driving member, and a pair of diametrically spaced pinions journaled to said driven member and meshing with said gears.

3. In a device of the kind described, a non-rotary casing, an internal ring gear secured to and exposed within said casing, driving and driven shaft journaled in said casing in co-axial arrangement and provided within said casing, respectively, with driving and driven heads, diametrically spaced planetary gears journaled to said driving head and meshing with said non-rotary ring gear, and diametrically spaced planetary pinions journaled to said driven head and meshing with said gears.

4. The structure defined in claim 2 in which the axes of said pinions are located much nearer to the axes of said shafts than are the axes of said gears.

5. The structure defined in claim 3 in which the axes of said pinions are located much nearer to the axes of said shafts than are the axes of said gears.

6. The structure defined in claim 3 in which said casing is made up of separable parts and said driving and driven heads are spaced to closely embrace said ring gear, said planetary gears and said planetary pinions.

WALTER J. WALLACE, Jr.